Patented Aug. 1, 1950

2,517,127

UNITED STATES PATENT OFFICE 2,517,127

POLYMETHYL METHACRYLATE MOLDING POWDERS

Erich F. Meitzner, Philadelphia, Pa., assignor to Rohm & Haas Company, Philadelphia, Pa., a corporation of Delaware No Drawing. Application January 6, 1949, Serial No. 69,592

4 Claims. (Cl. 260—86.1)

This invention relates to improved molding powders containing polymeric thermoplastic methyl methacrylate. It relates to molding powders which yield objects having greater dimensional stability and better heat resistance at elevated temperatures than objects heretofore produced from methacrylate molding powders. It also relates to the process of preparing such molding powders and to products molded therefrom.

The desirability of increasing the heat resistance and of improving the molding characteristics of methyl methacrylate resins has been recognized for some time. Efforts to bring about such improvements have included intensive mastication as well as prolonged heating and milling of the resin in the presence of a wide variety of chemical compounds. Among the compounds so used were sulfur compounds, including the long-chained mercaptans which are non-volatile at temperatures of 125° C. to 200° C. Such methods, however, have not been entirely satisfactory in that they have been expensive and/or time-consuming and have introduced into the resin foreign materials which often altered its color.

The process herein set forth is relatively inexpensive and consumes little time and, yet, it is very effective. It comprises exposing particles of methyl methacrylate resins of the size or sizes conventionally used as molding powders to vapors of sulfur compounds which, at atmospheric pressure, boil below about 70° C. Such compounds have the general formula R—SH, in which R represents hydrogen or an unsubstituted alkyl group of one to four carbon atoms. This process is a fumigation process, that is, one in which the resin is exposed to the vapors of the R—SH compounds. The R—SH compounds are sometimes referred to herein as fumigants or fumigating compounds. The resin particles are fumigated until they sorb from 0.05% to 0.2% of the fumigant, based on the weight of the resin. The fumigated product has superior molding characteristics, and plastic objects molded therefrom are characterized by exceptionally high resistance to heat-distortion.

This process may be carried out in a variety of ways. The chief requirement is that the particles of resin be intimately and thoroughly exposed to vapors of the fumigant. In the case of small batches, the vapors of the fumigating compound may be pumped into a vessel containing the particles of resin. Sorption of the vapors is expedited by stirring or tumbling the resin particles while exposed to the fumigant. Alternatively, a small container of the fumigant in the liquid form may be placed in a large container holding the resin, whereupon the fumigant is allowed to vaporize. In lieu of liquid, vapors under pressure may be used as fumigant. In some instances, a liquid fumigant may be poured directly into a container of resin and vaporized therein, although procedures described above are much preferred. The fumigating process may be made continuous by providing a conveyor carrying the particles of resin through a chamber in which vapors of fumigant at normal or increased pressure are introduced. During passage through the chamber, the resin particles sorb the fumigant vapors.

While the fumigation process may be conducted at normal or room temperatures, it may also be carried out at temperatures up to about 100° C. and, preferably, up to 70° C. Under these conditions, the vapors may be maintained under superatmospheric pressure. By using elevated temperatures and pressure, the rate of sorption of the fumigant by the resin particles is increased. In a particular application of this invention, a resin prepared by emulsion polymerization is dried in a chamber under vacuum at about 70° C. and, after being dried, is then treated under pressure while hot, and without removal from the chamber, with the vapors of the fumigant.

In accordance herewith, the individual particles of resin become exposed to the fumigant, and the latter is sorbed uniformly by the particles. The uniform distribution of the fumigant apparently results in the sorption of very small amounts thereof which produce a marked improvement in the properties of the resin. Sorption of quantities from 0.05% to 0.5%, and preferably from 0.05% to 0.2%, based on the weight of the resin, produces very satisfactory results. Larger amounts may be employed, but no marked advantage appears to be gained by doing so. A distinct advantage of this process resides in the fact that very small amounts of the R—SH compounds produce unexpectedly effective results. Appreciable contamination of the product is avoided and the color of the resin is not altered as in those processes where larger amounts, of the order of 1% or more, of compounds heretofore suggested have been used.

The present process does not require that the added compound be introduced into the resin by milling. If the resin is to be subjected to milling, for example, in order to incorporate a pigment thereinto, this should be done after it has been fumigated.

The fumigants used in accordance herewith have the general formula R—SH, in which R represents hydrogen or an alkyl group of one to four carbon atoms. Such compounds boil below 70° C. at atmospheric pressure. Compounds which may be employed are hydrogen sulfide, methyl mercaptan, ethyl mercaptan, n-propyl mercaptan, isopropyl mercaptan, and tert.-butyl mercaptan. In view of the high volatility of these materials, it is unexpected that their effectiveness is not lost when a resin fumigated with them is later milled on heated rolls.

While this process is particularly suited to the treatment of polymeric methyl methacrylate, it may also be used in the treatment of resins comprising mixtures containing methyl methacrylate copolymerized with up to 20%, and preferably 5% to 20%, of one or more of the following: Styrene, methyl acrylate, ethyl acrylate, and ethyl methacrylate. For example, this process may be applied to resins made by the copolymerization of the following mixtures: 95% methyl methacrylate and 5% ethyl acrylate; 80% methyl methacrylate and 20% styrene; 90% methyl methacrylate and 10% ethyl methacrylate; and 80% methyl methacrylate, 10% methyl acrylate, and 10% styrene.

As stated above, the heat stability of the resins is much improved by the fumigation process of this invention. Thus, objects or articles molded from resins treated as herein described can tolerate, without change, temperatures substantially higher than those which cause softening of the unfumigated resin. Furthermore, objects molded from the fumigated resins are much less prone to change in dimensions when heated than are objects molded from corresponding unfumigated resins.

The process herein described may be applied to resins of the various sizes and shapes used in conventional molding techniques. Fine particles, such as result from emulsion- or suspension-polymerization, may be fumigated as well as much larger particles obtained by breaking or granulating sheets or blocks of the resin. In general, such particles range in size from about one hundred mesh to four mesh.

The following examples serve to illustrate this invention:

*Example 1*

In the various parts of this example, the same batch of commercial polymeric methyl methacrylate molding powder was used. Also, the same equipment, manipulative steps, and tests were employed throughout.

A. The powdered resin, milled for five minutes on a two-roll mill, one roll of which was heated to 310° F. and the other to 220° F., was sheeted off and broken into small particles. These particles were injection-molded into bars five inches long, one-half inch wide, and one-quarter inch thick. Three bars were tested individually for heat distortion by standard test, ASTM648-45-T, in which the ends of a bar are supported while a standard weight is placed on the middle of the bar. The bar is heated at a constant rate and the temperature is recorded at which the bar has sagged in the middle to a standard depth. This is known as the heat-distortion temperature.

In this case, the average heat-distortion temperature of the three bars was 58° C.

Three other bars were heated for two hours at 100° C. in an oven equipped with circulating fan. The bars were then cooled to 25° C., and the shrinkage in length was measured. In this case, the shrinkage averaged fifty-five mils per inch of the original length of the bar.

B. Five hundred grams of the resin powder was placed in a one-liter balloon flask equipped with inlet and outlet tubes. The inlet tube was attached to a source of hydrogen sulfide, and the outlet tube was attached to a suction pump. The flask was substantially evacuated, the outlet was closed, and hydrogen sulfide was admitted through the inlet tube. After ten minutes, during which the flask was shaken several times, the source of hydrogen sulfide was removed and the flask was sealed and maintained overnight at room temperature. The fumigated resin was then milled for five minutes, after which it was granulated and injection-molded. The standard tests showed this fumigated resin to have a heat-distortion temperature of 74.5° C. and a shrinkage of only eight mils per inch.

C. A portion of the resin was fumigated as in B above and was then spread as a thin layer and exposed to the air for four hours prior to milling and molding. Aside from the period of exposure to air, this test was the same as B. Measurements showed a heat-distortion temperature of 72° C. and a shrinkage of nine mils per inch.

D. Still another portion of the resin was fumigated as in test B. After being stored overnight, it was spread as a thin layer and exposed to the air for four hours, after which it was molded. The milling operation was omitted in this test. The results of the tests showed that the molded material had a heat-distortion temperature of 71° C. and a shrinkage of nine mils per inch.

*Example 2*

A five-hundred gram portion of commercial polymeric methyl methacrylate molding powder, such as that employed in Example 1 above, was placed in a one-liter ballon flask along with an open vial containing 1.0 gram of ethyl mercaptan. The flask was stoppered and allowed to stand for seventeen hours at 25° C. During this time, the ethyl mercaptan evaporated completely and was sorbed by the resin.

On being milled, molded, and tested by procedure as noted in Example 1, it was found that the molded bars had a heat-distortion temperature of 80° C. and a shrinkage of five mils per inch.

*Example 3*

In this example, two five-hundred gram portions of a commercially prepared molding powder, consisting of 95% methyl methacrylate copolymerized with 5% ethyl acrylate, were employed. One portion alone was fumigated with 0.2% ethyl mercaptan in the manner described in Example 2. The two portions, one fumigated and the other unfumigated, were individually milled for ten minutes, cooled, and injection-molded as described above. The individual bars were then tested, and it was found that the bar molded from the fumigated resin had a heat-distortion temperature of 83° C. and a shrinkage of eight mils per inch, while the bar molded from the unfumigated material had a heat-distortion temperature of 70° C. and a shrinkage of forty mils per inch.

*Example 4*

Two five-hundred gram portions of a molding powder consisting of 80% methyl methacrylate copolymerized with 20% styrene were employed. One portion alone was fumigated with 0.2% ethyl mercaptan in the manner described in Example 2. The two portions, one fumigated and the other unfumigated, were individually milled for ten minutes, cooled, and injection-molded as described above. The individual bars were then tested, and it was found that the bar molded from the fumigated resin had a heat-distortion temperature of 88° C. and a shrinkage of three mils per inch, while the bar molded from the unfumigated material had a heat-distortion temperature of 82° C. and a shrinkage of eleven mils per inch.

Further tests, wherein the bars were subjected to a temperature of 100° C. for forty-eight hours, showed that the bars of unfumigated molding powder had a shrinkage of thirty-four mils per inch while the bars of fumigated molding powder had a shrinkage of only five mils per inch.

Test bars prepared in accordance with the above examples, upon being examined for color, showed no difference between the bars of fumigated and unfumigated molding powders. Color-stability tests made by exposing the bars to outdoor weather for six months showed both sets of bars equally resistant to color change.

While, in the above examples, the injection molding technique was employed, the advantages of dimensional stability and increased heat resistance also result when the fumigated molding powder is molded by other methods, such as compression and extrusion.

As will be seen from the above examples, fumigation of the molding powder with very small amounts of fumigant effects marked improvements in the heat-resisting properties. The required amounts of fumigant are small and, therefore, do not have a deleterious effect upon the color of the final product. It is further evident that the fumigation process effects improvements without requiring milling of the resin, although it does not interfere with milling if that procedure is required, for example, to incorporate pigments into the resin. Thus, by a fumigation process, there are prepared thermoplastic resinous molding powders of polymeric methyl methacrylate alone or of methyl methacrylate copolymerized with styrene, ethyl methacrylate, methyl acrylate, and ethyl methacrylate up to 20% of the total and which carry from 0.05% to 0.2% of a compound sorbed from the vapor phase by the molding powder.

I claim:

1. In the process of producing a thermoplastic resinous molding powder of polymerized methyl methacrylate containing up to 20% of a copolymerized member of the group consisting of styrene, methyl acrylate, ethyl acrylate, and ethyl methacrylate, the improvement which comprises exposing said molding powder in the dry form to vapors of a compound of the general formula R—SH, in which R represents a member of the group consisting of hydrogen and alkyl groups of one to four carbon atoms, which compound boils at atmospheric pressure below 70° C., until said powder sorbs from 0.05% to 0.5% of said compound.

2. In the process of producing a thermoplastic resinous molding powder of polymerized methyl methacrylate, the improvement which comprises exposing said molding power in the dry form to vapors of a compound of the general formula R—SH, in which R represents a member of the group consisting of hydrogen and alkyl groups of one to four carbon atoms, which compound boils at atmospheric pressure below 70° C., until said powder sorbs from 0.05% to 0.5% of said compound.

3. In the process of producing a thermoplastic resinous molding powder of polymerized methyl methacrylate containing 5% to 20% of copolymerized ethyl acrylate, the improvement which comprises exposing said molding powder in the dry form to vapors of a compound of the general formula R—SH, in which R represents a member of the group consisting of hydrogen and alkyl groups of one to four carbon atoms, which compound boils at atmospheric pressure below 70° C., until said powder sorbs from 0.05% to 0.2% of said compound.

4. In the process of producing a thermoplastic resinous molding powder of polymerized methyl methacrylate containing up to 20% of a copolymerized member of the group consisting of styrene, methyl acrylate, ethyl acrylate, and ethyl methacrylate, the improvement which comprises exposing said molding powder in the dry form to vapors of ethyl mercaptan until said powder sorbs from 0.05% to 0.2% of said ethyl mercaptan.

ERICH F. MEITZNER.

REFERENCES CITED

The following references are of record in the file of this patent:

UNITED STATES PATENTS

| Number | Name | Date |
|---|---|---|
| 2,462,895 | Quinn | Mar. 1, 1949 |